United States Patent [19]

Budman et al.

[11] Patent Number: 5,351,652
[45] Date of Patent: Oct. 4, 1994

[54] RECREATIONAL AND AMUSEMENT DEVICE FOR HORSES

[76] Inventors: Sandra E. Budman; Jack F. Budman, both of 21 Valerian Ct., Rockville, Md. 20852

[21] Appl. No.: 45,168
[22] Filed: Apr. 13, 1993
[51] Int. Cl.⁵ ............................................. A01K 13/00
[52] U.S. Cl. ...................................... 119/711; 446/29
[58] Field of Search ................... 119/29, 29.5; 446/29; 482/77, 20; 273/58 B, 58 BA, 58 K, 58 R, DIG. 20

[56] References Cited

U.S. PATENT DOCUMENTS

| | | | |
|---|---|---|---|
| 777,478 | 12/1904 | Minor | 273/DIG. 20 |
| 3,356,367 | 12/1967 | Tewksbury | 482/77 |
| 3,520,534 | 7/1970 | Bennett et al. | 482/77 |
| 4,081,182 | 3/1978 | O'Brien | 482/77 |
| 4,825,812 | 5/1989 | Visalli et al. | 119/29.5 X |

FOREIGN PATENT DOCUMENTS 1188459  4/1970  United Kingdom ................. 482/77

Primary Examiner—Thomas Price

[57] ABSTRACT

A recreational device for horses takes the form of a resilient body having a grip simulating a bridle bit and adapted to be engaged between a horse's upper and lower teeth. The body material is impregnated or otherwise treated with a substance to produce an aroma of apple, honey, molasses-containing materials or other food substances attractive to horses. The body may be configured to prevent the device from rolling away from a horse and a preferred configuration having this feature is generally bell-shaped.

20 Claims, 2 Drawing Sheets

RECREATIONAL AND AMUSEMENT DEVICE FOR HORSES

BACKGROUND OF THE INVENTION

1. Technical Field

The present invention pertains to recreational and amusement devices for horses and, more particularly, to methods and apparatus for inducing and encouraging horses to play and exercise with such devices.

2. Discussion of the Prior Art

A known amusement device for horses is sold under the trademark HORSEBALL and comprises an inflatable hollow ball having a hollow grip in the form of a loop extending radially therefrom. Horses are encouraged to grasp the grip between their upper and lower teeth and then run and play with the grasped ball, thus helping them to exercise and strengthen their neck muscles and alleviate shyness around the face and head. When dropped the ball may be kicked about by the horses who may also fling the ball from their mouths as a source of therapeutic recreation and amusement. All of these activities result in exercise and reduced boredom for the horse. Although many horses readily take to the prior art device, there are some who may not. Accordingly, there is a need to improve upon the aforesaid device to render it more appealable to most horses.

It has also been observed that the prior art spherical amusement device has a tendency to roll away from a horse, particularly on sloped terrain. For some horses and their owners this tends to bring on frustration and discouragement, resulting in a permanent dislike and avoidance of the device. It is desirable, therefore, to improve the device in a manner that prevents the device from rolling away from a horse.

OBJECTS AND SUMMARY OF THE INVENTION

Accordingly, it is an object of the present invention to provide an improvement to the aforesaid amusement device to render it more readily appealable to horses and to avoid discouragement against its use.

In one aspect of the present invention the ball grip is configured as a bridle bit so as to be more familiar and comfortable to horses. The particular bridle bit disclosed herein is a snaffle bit and is preferably hollow to provide flow communication with the hollow ball interior.

In another aspect of the invention the elastomeric ball material is impregnated or otherwise treated with a substance that emits an aroma of a food treat for horses. The aroma, which may be derived from actual food substances or from compounds designed to simulate the food aroma, is typically that of apple, honey, molasses-containing products or combinations of these.

In still another aspect of the invention the device is configured to prevent it from rolling away from a horse. In the preferred embodiment the device has a generally bell-like configuration with a widened convex bottom. The tapered bottom-to-top shape causes the device, if tipped, to roll along a circular path about its narrow end. The convex bottom causes the upright device to rock about its upright position in response to kicks, nudges, and similar horizontally applied forces and, in most instances, prevents the device from tipping over on to its side. As a result, the grip is substantially always accessible and easily grasped, even while the horse is running.

These and other objects, features and many of the attendant advantages of the present invention will be appreciated more readily as they become better understood from a reading of the following description considered in connection with the accompanying drawings wherein like parts in each of the several figures are identified by the same reference characters.

DESCRIPTION OF THE PREFERRED EMBODIMENTS

Figure 1:
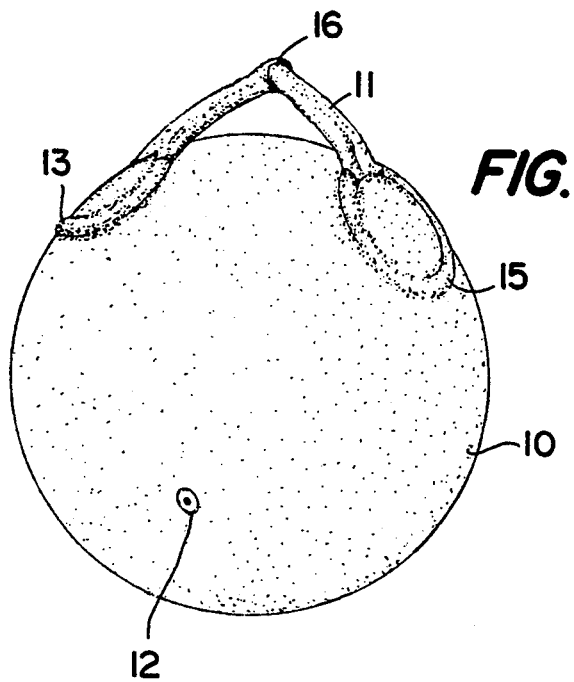
FIG. 1 is a view in perspective of a preferred embodiment of the horse amusement device of the present invention.
Figure 2:
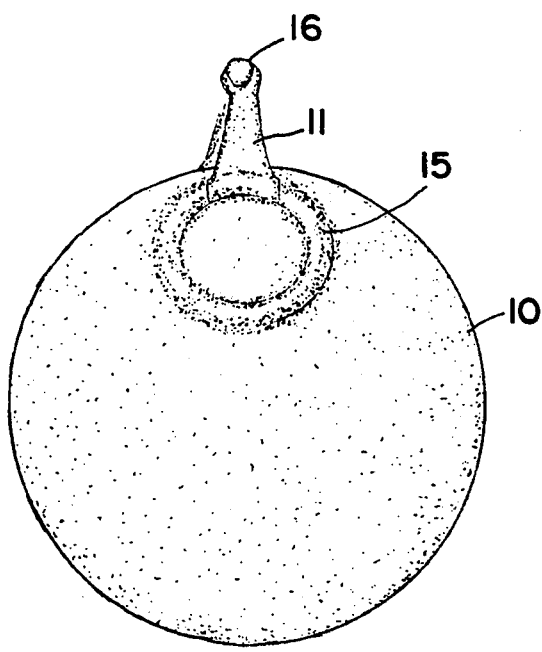
FIG. 2 is a side view in elevation of the device of FIG. 1.
Figure 3:
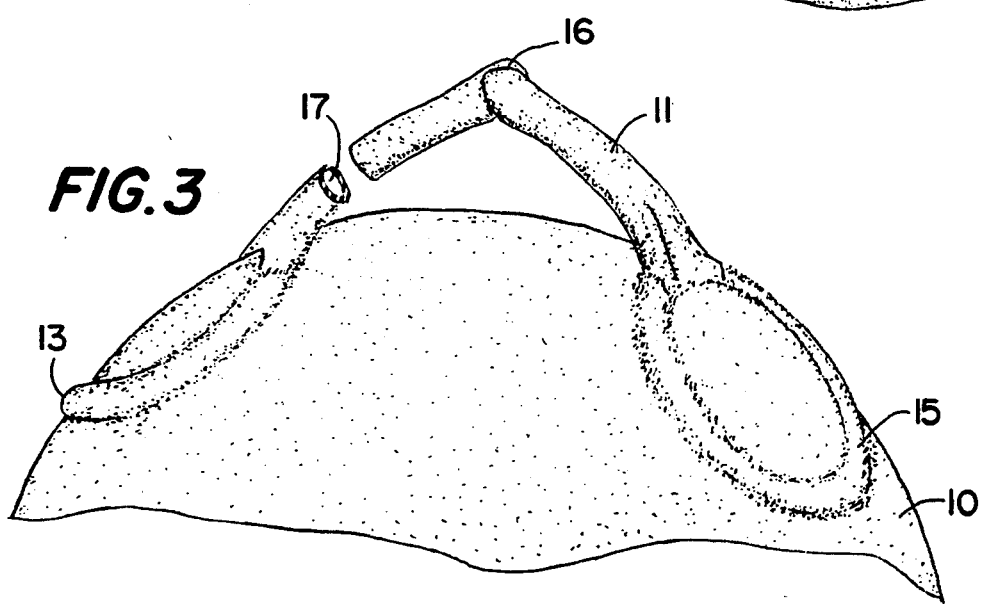
FIG. 3 is a detail view in perspective and partially broken showing the grip portion of the device of FIG. 1.

Referring more specifically to the drawings, one embodiment of an amusement and recreational device 10 for horses takes the form of an inflatable ball of rubber, vinyl or other elastomeric material. The device is preferably molded from that material using conventional molding procedures. An inflation valve 12 for receiving an inflation needle is suitably disposed in the ball periphery. It should be noted, however, that for purposes of the principles of the present invention, device 10 need not be spherical and need not be inflatable. Rather, it is only necessary that the device be resilient enough to bounce when dropped from a height of at least one foot. In this regard, the device can be a cube, a regular or irregular polyhedron, conical, bell-shaped, oblate, prolate, or any other solid or hollow shape.

A characteristic feature of device 10 is its grip 11 taking the form of a bridle bit. In the preferred embodiment the bridle bit is a snaffle bit extending between two locations on the ball periphery. At each such location the surface of the ball is raised to define a decorative ring 13, 15 simulating the bridle engagement rings of a snaffle bit. Grip 11 extends away from the ball and bridges rings 13 and 15. Substantially centrally located in grip 11 is a simulated snaffle bit joint 16 formed of two engaged simulated eye members. The entirety of grip 11 is hollow to provide a flow passage 11 in communication with the hollow ball interior at both of the grip ends. Bit joint 16 is, as stated, simulated, meaning that the outside contour appears as a joint, but the joint eyes are integrally formed and mutually fixed in position.

Grip 11 is sized and spaced from ball 10 to permit the grip to be readily engaged between a horse's upper and lower teeth. Typically, the length of grip 11 is on the order of four to six inches, and the spacing of simulated knuckle joint 16 from the ball surface is on the order of three to five inches. These dimensions are stated by way of example only and are not limiting on the scope of the present invention. The familiar feel of the simulated snaffle bit, or any other bridle bit, on the horse's tongue and between a horse's teeth renders it more likely that a horse will play with the ball.

Figure 4:
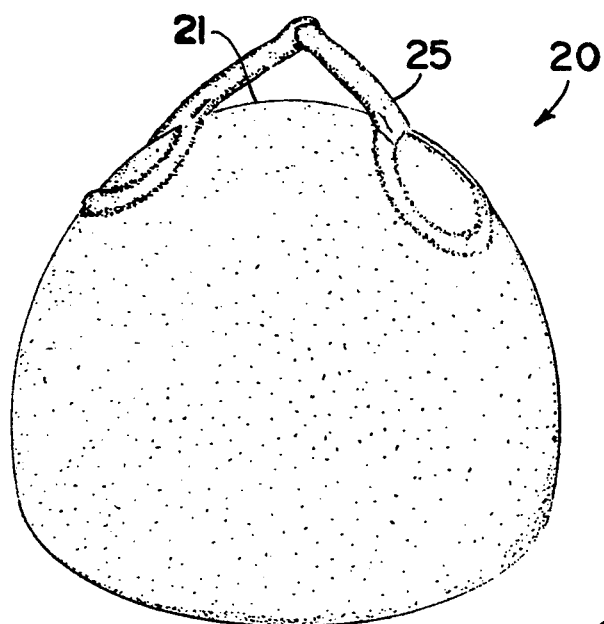
FIG. 4 is a view in perspective of an alternative embodiment of the amusement device of the present invention.
Figure 5:
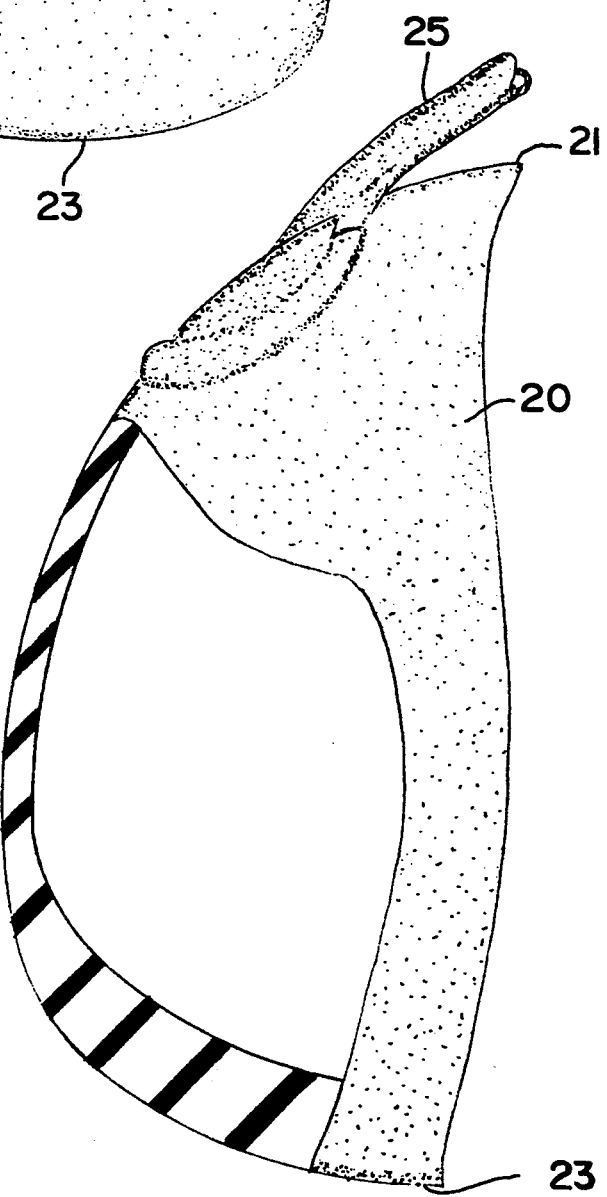
FIG. 5 is a detail side view in elevation and partial section of a portion of the device of FIG. 4.

An alternative embodiment of the invention is illustrated in FIGS. 4 and 5 and takes the form of a generally bell-shaped device 20. Device 20 is molded from the same material as device 10 and is also designed to bounce when dropped to the ground from a height of at least one foot. The device may be hollow and inflatable, hollow and sealed, or solid, and the material employed will depend on which of these configurations is used. The generally bell-shaped configuration includes a narrow top 21 from which the device body diverges toward a significantly widened base 23 having a convex bottom surface normally resting on the ground. A simulated snaffle bit grip 25 is secured to top 21 and has the same general characteristics described above for grip 11. The wall forming base 23 may be thickened, as shown, or weighted, to provide stability for the device in its upright position. In particular, the weighted convex base 23 causes device 20 to rock about a vertical axis but not tip over in response to most horizontally directed forces. In addition, if the base is sufficiently convex and weighted, the device is unstable when tipped over so that it automatically rights itself to the desired vertical position shown. This feature facilitates grasping of grip 25 by the horse. Moreover, the automatic uprighting feature entirely eliminates the problem of the device rolling. Even if the weighting and convexity do not provide for automatic uprighting, device 20, if it rolls at all, rolls along a circular path centered about narrow end 21 and having a radius corresponding to approximately the top-to-bottom length along a side of the device.

The bell configuration is highly advantageous to prevent the device from rolling away and to cause the device to automatically right itself, while still permitting the device to bounce. However, other configurations may serve these functions. For example, a pyramidal or other multi-faceted polyhedral configuration may be employed for this purpose. In an exemplary embodiment, device 20 may have the following dimensions: the height of the device from narrow end 21 to base 23 along the central longitudinal axis is 22"; the diametric width at base 23 is 18"; the radius of curvature of the convex base 23 is 12"; and the radius of curvature of narrow end 21 is 7". These dimensions are all approximate and provided by way of example only.

According to another aspect of the invention, the material from which ball 10 and device 20 are formed is treated with a substance that emits from the ball or device an aroma that appeals to horses. Typically, the aroma emitted will be that of apple, honey, molasses type substances or combinations of these. In the preferred embodiment of the invention, the substance is impregnated into the elastomeric material in a conventional manner; other known processes for rendering the material aroma-emitting may be employed. Whatever the technique, the emission of an aroma that appeals to a horse dramatically increases the likelihood that the horse will play with the ball.

From the foregoing description it will be appreciated that the invention makes available a novel recreational and amusement device for a horse wherein a grip in the form of a bridle bit, and the emission of an aroma appealing to a horse, render it more likely that horses will play with the recreational and amusement device.

Having described a preferred embodiment of a new and improved recreational and amusement device for horses in accordance with the present invention, it is believed that other modifications, variations and changes will be suggested to those skilled in the art in view of the teachings set forth herein. It is therefore to be understood that all such variations, modifications and changes are believed to fall within the scope of the present invention as defined by the appended claims.

What is claimed is:

1. A recreational device for horses comprising:
   a resilient body capable of bouncing when dropped from a height of at least one foot; and
   a grip extending from said body and having a configuration suitable for engagement between a horse's upper and lower teeth;
   wherein said body includes material treated to emit an aroma of food for horses.

2. The recreational device of claim 1 wherein said grip is a simulated bridle bit.

3. The recreational device of claim 2 wherein said bit is a snaffle bit.

4. The recreational device of claim 1 wherein said resilient body is an inflatable sphere and said material is elastomeric.

5. The recreational device of claim 4 wherein said grip is hollow and in flow communication with the interior of said inflatable sphere at two locations on the ball periphery.

6. The recreational device of claim 5 wherein said resilient body has a non-spherical configuration to limit the ability of said body to roll along a surface.

7. The recreational device of claim 4 wherein said elastomeric material is impregnated with an aroma-producing substance to emit said aroma.

8. The recreational device of claim 1 wherein said food is selected from the group consisting of apple, honey, molasses-containing substances and combinations thereof.

9. The recreational device of claim 1 wherein said resilient body is generally bell-shaped with a relatively wide base and relatively narrow top, and wherein said grip is disposed at said top.

10. The recreational device of claim 9 wherein said base is sufficiently convex and weighted to cause the device, when tipped, to automatically right itself into a vertical position with said base resting on the ground.

11. The recreational device of claim 9 wherein said resilient body is an elastomeric material impregnated with an aroma-producing substance to emit said aroma.

12. A recreational device for horses comprising:
    an inflatable body having a hollow interior and capable of bouncing when inflated and dropped to a surface from a height of at least one foot; and
    a grip extending from said body and configured as a hollow bridle bit suitable for engagement between a horse's upper and lower teeth, said bridle bit having a hollow interior and first and second ends secured to respective first and second locations on said body to provide flow communications through the hollow bridle bit interior from the interior of said body.

13. The recreational device of claim 12 wherein said bridle bit is a snaffle bit.

14. The recreational device of claim 12 wherein said body is a molded elastomeric material impregnated with a substance emitting an aroma of a sweet horse food.

15. The recreational device of claim 14 wherein said body is spherical.

16. The recreational device of claim 11 wherein said body is generally bell-shaped with a relatively narrow top and a relatively wide base, and wherein said grip is disposed at said top.

17. The recreational device of claim 16 wherein said base is sufficiently convex and weighted to cause the device, when tipped, to automatically right itself into a vertical position with said base resting on the ground.

18. The recreational device of claim 12 wherein said resilient body has a non-spherical configuration to limit the ability of said body to roll along said surface.

19. A recreational device for horses comprising:
an inflatable body having a hollow interior and capable of bouncing when inflated and dropped to a surface from a height of at least one foot;
wherein said body has non-spherical configuration to limit the ability of said body to roll along said surface; and
a grip having first and second ends secured to respective first and second locations on said body, said grip extending continuously between said first and second locations and spaced from said body along part of the grip length by a distance sufficient to permit the grip to be readily engaged between the upper and lower teeth of a horse, wherein said grip is configured as a simulated snaffle bit.

20. The recreational device of claim 19 wherein said simulates snaffle bit includes first and second simulated bridle engagement rings disposed on and raised from said body at respective first and second spaced locations, a simulated snaffle bit joint comprising two engaged simulated eye members disposed intermediate said rings at a location spaced from said body, and first and second grip portions extending between said joint and said first and second rings, respectively.

* * * * *